(12) United States Patent
Liu (10) Patent No.: US 8,984,589 B2
(45) Date of Patent: Mar. 17, 2015

(54) CLOUD-BASED BILLING, CREDENTIAL, AND DATA SHARING MANAGEMENT SYSTEM

(75) Inventor: Huan Liu, Sunnyvale, CA (US)

(73) Assignee: Accenture Global Services Limited, Dublin (IE)

( * ) Notice: Subject to any disclaimer, the term of this patent is extended or adjusted under 35 U.S.C. 154(b) by 568 days.

(21) Appl. No.: 12/948,065

(22) Filed: Nov. 17, 2010

(65) Prior Publication Data

US 2011/0265147 A1 Oct. 27, 2011

Related U.S. Application Data

(60) Provisional application No. 61/328,448, filed on Apr. 27, 2010.

(51) Int. Cl.
| | | |
|---|---|---|
| *G06F 7/04* | (2006.01) | |
| *G06F 15/16* | (2006.01) | |
| *G06F 17/30* | (2006.01) | |
| *H04L 29/06* | (2006.01) | |
| *H04N 7/16* | (2011.01) | |

(52) U.S. Cl.
CPC .............. *H04L 63/08* (2013.01); *H04L 63/105* (2013.01)
USPC ...................................... 726/4; 726/5; 726/28

(58) Field of Classification Search
USPC .............................. 726/1–7, 9, 16–21, 26–30
See application file for complete search history.

(56) References Cited

U.S. PATENT DOCUMENTS

| | | | | |
|---|---|---|---|---|
| 7,636,764 | B1* | 12/2009 | Fein et al. ...................... | 709/212 |
| 2003/0105810 | A1* | 6/2003 | McCrory et al. .............. | 709/203 |
| 2009/0228967 | A1* | 9/2009 | Gbadegesin et al. ............. | 726/8 |
| 2010/0131948 | A1* | 5/2010 | Ferris ................................ | 718/1 |
| 2011/0099616 | A1* | 4/2011 | Mazur et al. ...................... | 726/7 |
| 2011/0131316 | A1* | 6/2011 | Ferris et al. .................... | 709/224 |

OTHER PUBLICATIONS

Infoq.com [online], "A Distributed Access Control Architecture for Cloud Computing," Oct. 2, 2014, accessible at URL http://www.infoq.com/articles/distributed-access-control-architecture-for-cloud- computing, copyright 2006-2014, 25 pages.
Min et al., "Cloud Computing Security Issues and Access Control Solutions," *Journal of Security Engineering*, 2012, 9(2):135-142.
Spideroak.com [online], "Access Control in a Cloud Computing Environment," Oct. 2, 2014, accessible at URL https://spideroak.com/privacypost/cloud-security/access-control-issues-in-cloud-computing-environment/, copyright 2013, 5 pages.

* cited by examiner

*Primary Examiner* — Shewaye Gelagay
*Assistant Examiner* — Trong Nguyen
(74) *Attorney, Agent, or Firm* — Fish & Richardson P.C.

(57) ABSTRACT

A novel solution is provided that utilizes the two-credential characteristics of accessing cloud-hosted data in a portal-oriented enterprise-specific solution. Cloud computing resources may be accessed through a separate, enterprise-specific portal clients used to manage a set of cloud service accounts. Individuals (e.g., employees of the enterprise or company) may access cloud computing resources via an instance of the portal client, and any communication between individuals in an enterprise and cloud services may be facilitated through the portal. Each portal client may also be configured to be compatible with any cloud service vendor.

47 Claims, 9 Drawing Sheets

CLOUD-BASED BILLING, CREDENTIAL, AND DATA SHARING MANAGEMENT SYSTEM

CLAIM OF PRIORITY

This application claims priority to U.S. Provisional Patent Application No. 61/328,448, entitled "Cloud-Based Billing, Credential, And Data Sharing Management System," and filed Apr. 27, 2010 in the United States Patent and Trademark Office.

BACKGROUND

Cloud computing provides computation capacity and storage on demand. Typical cloud computing service agreements are based on a self-service usage model which allows a virtually unlimited amount of computing resources to be dynamically requisitioned, on demand, from a pool of shared computing resources offered by a cloud computing vendor. In a typical cloud-provisioning sequence, a user requests a virtual server from a cloud computing vendor through the vendor's user interface (through a web application, for example) and the server may be available within a few short minutes. This eliminates the need to buy a significant portion of the capital equipment upfront. Moreover, provisioned cloud computing resources are programmable. For instance, when an application needs additional capacity due to unexpected or peak consumer demand, the capacity may be dynamically and immediately requisitioned through a simple Application Programming Interface (API) call. There is no longer the need to over-provision to accommodate peak demand.

Cloud computing may include many different types of cloud services. One sample service is Infrastructure as a Service (IaaS), where a user can request Virtual Machines (VM). Other services may include key value storage services, semi-structured storage services, or messaging services. Although the cloud computing model gives individuals quicker access to the resources, it also presents significant problems for enterprise management. These problems include, for example, a lack of control over resource usage, and difficulties in data sharing with other group or team members, even with access to the same cloud computing resources. First, the conventional purchasing model employed by many cloud computing vendors does not conform to the standard enterprise purchasing order process, which can result in additional complexities in budget allocations. According to a common cloud computing practice, individual developers employed by an enterprise may still requisition cloud resources separately during the course of employment. Under such practices, the developer may be billed by the cloud computing vendor personally, and may be subsequently reimbursed by the developer's employer. Unfortunately, in these situations enterprise managers may not have control or even direct knowledge over the individual developer's resource usage until that usage is billed. Since developers may accrue cloud computing service charges personally, a manager may have little to no control on keeping usages within or under budget. Typically, managers and executives may see a total accrued cost only at the end of the month when the developer submits for reimbursement.

Potentially of even greater concern, an IT department may have little to no control over the data an individual may store in a cloud resource and may be unable to enforce corporate policy. Since a cloud account is under the absolute control of the individual user (and not, generally speaking, the department or supervisor's), a disreputable employee could easily abuse the system. For example, a security policy may mandate that all data stored in a cloud should be encrypted, but an individual can easily ignore the policy, knowing that the IT department or supervisor has no ability to audit. The developer may also store company sensitive data in cloud resources against company policy, for example, and sensitive corporate (proprietary) data may be subject to potential exploitation without the corporation's awareness or knowledge if stored in a personal cloud account. Worse yet, when the employee leaves the company, there may be no easy way to recover company data stored in the developer's cloud account, or prevent the individual's removal, destruction, tampering or duplication of the potentially sensitive and valuable data.

Also, since each developer has (initially) exclusive access to any requisitioned cloud resources, sharing data stored in cloud resources with collaborating coworkers may be difficult. Currently, sharing data hosted in a cloud requires the proprietor of the cloud resource to be shared to acquire identification information within the system for each intended collaborating developer, such as an account ID, and assign data permissions to those IDs specifically. Unfortunately, individual account IDs may be hard to keep track as often the account IDs do not correspond (intuitively) to a user's actual name. Furthermore, data sharing is often with a group of people, so managing data sharing at an individual user level is often cumbersome and time consuming when larger numbers of collaborators are desired.

Moreover, cloud access is different from other resources access in that it typically requires two sets of credentials. The first credential, referred here as the master credential and typically implemented in the form of a user name and password combination, is used by an individual to gain access to the cloud portal. Master credentials are often configurable by the corresponding user. Once logged in to the cloud portal, the user can request the second credential, referred here as the cloud credential, which is typically in the form of a set of keys (e.g., access key and secret key) or authorization tokens. For the sake of security, the keys are typically fairly long and complex, often appearing as a randomized string of numbers, letters and symbols that do not conform to typical mnemonic structures, thus, sharing the keys may be cumbersome if many contributors are expected or desired.

Finally, usage of cloud computing resources often makes it difficult to manage credentials securely. Many cloud services are invoked through a web services API. A user must present valid credentials in order to successfully invoke these APIs. The ability to share certain provisioned cloud resources between multiple users may also compromise credential security. For example, a requisitioned cloud virtual machine (VM) image may be shared between users. If a VM image needs to access other cloud services and/or services however, the VM image may have to embed the cloud credential in order to successfully proceed through embedded security protocols. Unfortunately, when the VM image is shared with other users, the user's cloud credential may inadvertently be shared amongst the other users as well.

Even if a VM image is never shared, since the image is stored in the cloud, there is the danger that a hacker may hack the image file to obtain the credential. In addition, when the credential is changed (rotating credential regularly is an increasingly popular cloud practice), the shared VM image must be changed. Unfortunately, data sharing in a cloud environment itself may be difficult. When a user needs to share data (e.g., either cloud-stored data or a VM image) with other users, the user must obtain the other users' cloud account IDs and then share the data with the targeted IDs. Since the mapping from a user to the user's cloud account ID is often maintained manually, it is cumbersome and time consuming to manage data sharing.

SUMMARY

In an embodiment, a cloud management system is provided that includes a credential repository. The credential repository may be implemented, for example, as a graphical user interface, a web server, and a database. Users of the cloud management system may connect to and interact with the system through the graphical user interface (the portal client) in order to sign into the system and gain access to additional functionality. In order to gain access to the system, the user must supply credentials in order to verify the user's identity and level of authorization.

The credentials supplied by the user are received by the web server, which queries the database, in which a log of credentials is stored. Once the particular user's identity (and level of authorization) is verified, the user is granted access to one or more tiers of functionality. Users with administrative and/or executive access are granted access to the tier of functionality that is related to account management—such as billing, profile/payment information, policy enforcement and auditing. Users with program access are granted access to programmatic features only. These features may include access to access points of third party cloud computing providers and cloud service vendors, where the user is able to provision cloud computing resources or access and modify pre-provisioned cloud resources. Accordingly, this solution may provide an expansion of a management of cloud computing resources beyond an individual's exclusive control.

BRIEF DESCRIPTION OF THE DRAWINGS

The accompanying drawings, which are incorporated in and form a part of this specification, illustrate embodiments of the invention and, together with the description, serve to explain features of the disclosure.

DETAILED DESCRIPTION

Reference will now be made in detail to embodiments of the claimed subject matter for managing applications to avoid low and/or compromised bandwidth in a cloud data center, examples of which are illustrated in the accompanying drawings. While the claimed subject matter will be described in conjunction with the disclosed embodiments, it will be understood that they are not intended to be limit to these embodiments. On the contrary, the claimed subject matter is intended to cover alternatives, modifications and equivalents, which may be included within the spirit and scope as defined by the appended claims.

Furthermore, in the following detailed descriptions of embodiments of the claimed subject matter, numerous specific details are set forth in order to provide a thorough understanding of the claimed subject matter. However, it will be recognized by one of ordinary skill in the art that the claimed subject matter may be practiced without these specific details. In other instances, well known methods, procedures, components, and circuits have not been described in detail as not to unnecessarily obscure aspects of the claimed subject matter.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Conventional Cloud Access Model

Figure 1:
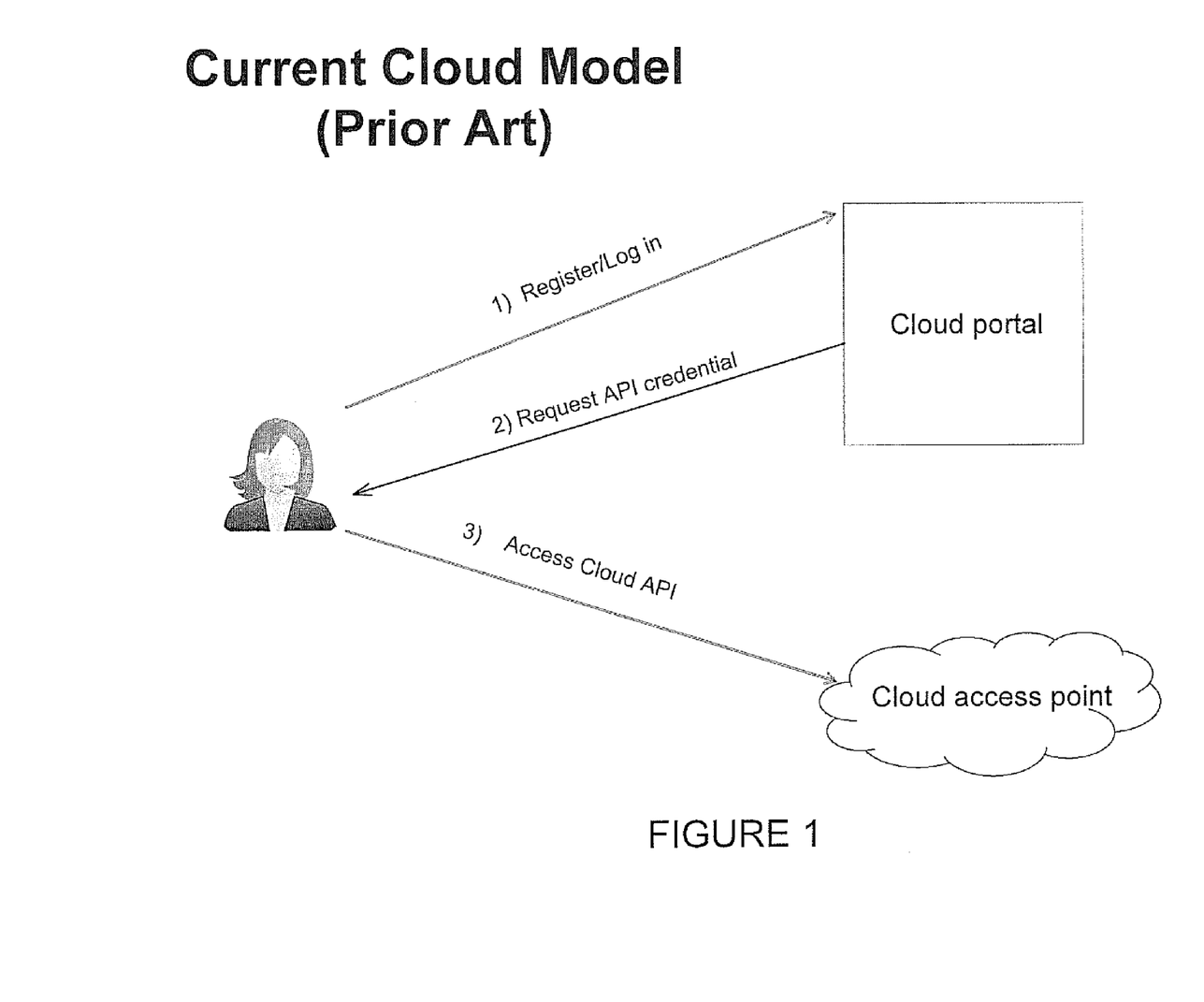
FIG. 1 is an illustration of a typical cloud access model, in accordance with conventional practice.

FIG. 1 is an illustration of a typical cloud access model, in accordance with conventional practice. According to conventional methodologies, to access cloud resources, a user must first register for an account at a cloud vendor's portal page—such as a web page (e.g., at step 1). During registration, the user establishes a username and password pair, which is used to login to the cloud portal, access services, and manage the cloud account. This username/password pair is commonly referred to as the "master credential." Using the master credential, a user can login to the cloud portal to obtain a second credential, commonly referred to as an API Credential—a credential needed to make programmatic API calls to access cloud resources.

The particular format of API credentials may vary according to the cloud provider. For example, in one embodiment, the API credential may consist of an access key and a secret key. In other embodiments, the API credential may consist of an API key and a shared secret. In still further embodiments, the API credential is an authorization token. According to these embodiments, the authorization token may not be obtainable directly from the cloud portal, and a user must first login to obtain a username and an API access key, then use them in a subsequent process to obtain the authorization token through an API. According to conventional implementations, mere knowledge of the API credential is not enough to completely control the cloud account. For example, it is not generally possible to edit profiles and view/change the billing credit card with the API credential only, and without the master credential. However, knowing the API credential is enough to access cloud resources.

In order to access the cloud, once a user registers with the cloud, and is granted an API credential from an account with master credential authorization, the cloud portal will prompt the user to enter the API credential (e.g., at step 2). A user is granted access to the cloud provider's access point (typically the cloud provider's web interface) if the user successfully submits an API credential corresponding to the user's account (e.g., at step 3).

According to conventional cloud access models however, one cloud account is often used to support a whole enterprise, and a enterprise-specific interface is built to multiplex multiple cloud users through the same cloud account. First, In these models, the interfaces may be required to be extremely scalable (which may increase engineering and maintenance costs) since all access to and from the cloud goes through those interfaces. In addition, this approach may be unsuitable to perform accurate accounting between different projects. For example, a provisioned virtual machine could consume significant bandwidth charges, but since its bandwidth usage does not go through the management interfaces, it is not possible for those interfaces to meter and bill projects for those bandwidth charges.

Figure 2:
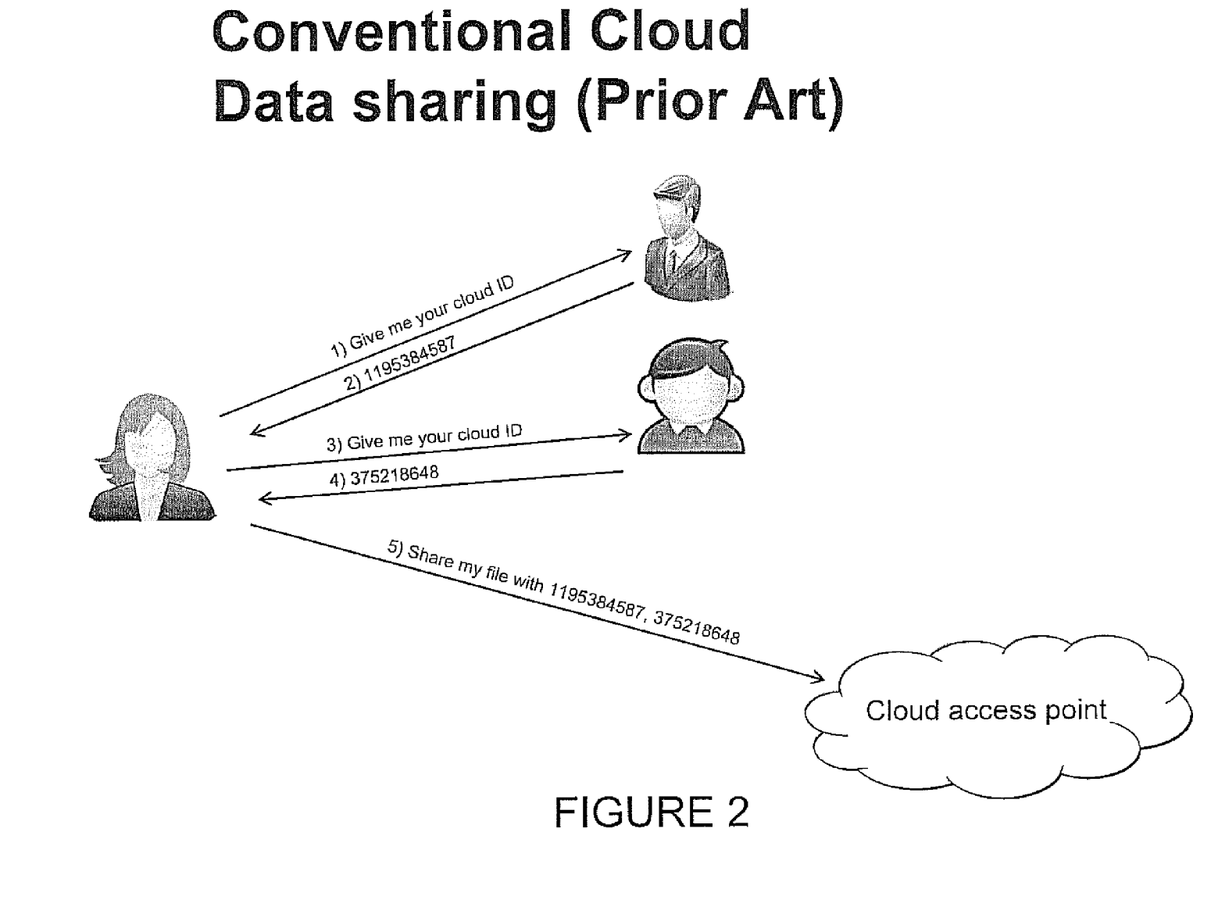
FIG. 2 is an illustration of a typical data sharing process in a cloud, in accordance with conventional practice.

In addition, data sharing practices in conventional cloud access models may also suffer from this lack of abstraction. FIG. 2 is an illustration of a typical data sharing process in a cloud, in accordance with conventional practice. Since each individual user account is largely exclusive and autonomous, data sharing within a conventional cloud access model may require a user obtaining the user ids of the users with which data sharing is desired, specifically identifying those user ids within the cloud provider's access point to grant access to the accounts corresponding to the user ids. This process may have to be done manually, and, consequently, may be extremely time consuming if data sharing is desired among many user accounts. Moreover, if the users with which data sharing is desired wish to share data themselves, the process must again be repeated for all desired data sharing recipients. Even more cumbersome, the user ids may be specific to a particular cloud vendor or provider. Thus, data sharing across multiple vendors or providers may become prohibitively inefficient and complex.

Cloud Management System

As a solution to the problems noted above, this disclosure provides a novel solution that utilizes the two-credential characteristics of accessing cloud-hosted data in a portal-oriented enterprise-specific solution. Cloud computing resources may be accessed through a separate, enterprise-specific portal that clients may use to manage a set of cloud service accounts. Individuals (e.g., employees of the enterprise or company) may access cloud computing resources via an instance of the portal client, and any communication between individuals in an enterprise and cloud services may be facilitated through the portal. Each portal client may also be configured to be compatible with any cloud service vendor.

The master credential for each account is stored with the client and inaccessible to the individual. Since the master credential is removed from the individual user, control over the usage and billing may be maintained at the portal (enterprise) level. Likewise, access to data stored in a cloud may also be efficiently shared with other collaborators (e.g., through other instances of the same enterprise-specific portal) and managed by other enterprise officials or executives. Accordingly, this solution provides an expansion of a management of cloud computing resources beyond an individual's exclusive control.

The claimed subject matter is directed to an approach for managing a plurality of cloud user accounts while abstracting oversight and management capability from individual users by employing a multi-tiered, multi-protocol account management system. In an embodiment, the account management system may be implemented as credential vault, or repository, which may include features such as a database, a web server, and instantiable graphical user interface.

In an embodiment, a cloud management system is provided to manage usage and control data hosted in cloud computing resources. A cloud management system may be a portal solution specific to an enterprise. Specifically, the cloud management system is in charge of a set of cloud accounts, and for each account, it holds the master credential. Furthermore, a program simulating user access may be executed (e.g., via screen scraping technology) to create accounts with a specific vendor. According to some embodiments, accounts may be created on-demand. The cloud management system subsequently downloads the cloud (API) credential for each cloud account. In further embodiments, the cloud management system may also facilitate a single billable account that includes multiple "threads" (each individual account). This allows cloud usage charges to be charged directly to the corporate account. In addition, the Cloud management system may also download usage reports from the cloud portal each month to keep track of the spending on each cloud account.

An individual or employee may access cloud computing resources by registering for cloud access through the cloud management system. Once registered, the individual is assigned a dedicated cloud account and the individual is given access to the cloud credential corresponding to the individual's particular cloud account. However, access to the master credential is not granted to the individual. Since the individual would not have access to the cloud portal, tasks normally performed in cloud computing resources or on cloud hosted data can only be accessed through the Cloud management system (and by extension, through the portal).

By implementing a tiered cloud management system, a company's officials or executives are able to exert full control over the enterprise's cloud usage. The features include more efficient billing, preservation of proprietary materials and data, and simpler data sharing. For example, by applying a single cost source (e.g., a company or enterprise-wide billing account), an individual no longer has to pre-pay for usage of cloud resources with personal assets. This also eliminates the need for any process for requesting and addressing compensation from the company.

According to embodiments of the present disclosure, the master credential and the API credential may be separated to maintain singular control while extending access to multiple users. In one embodiment, both credentials may be managed and stored in a secured software module. When a user is approved to have access to cloud resources, a unique cloud account may be generated for the user with API credentials. However, the user is only given the API credential so that the user is able to access cloud resources, but the master credential is not provided to the user.

Managing User Accounts

Figure 3:
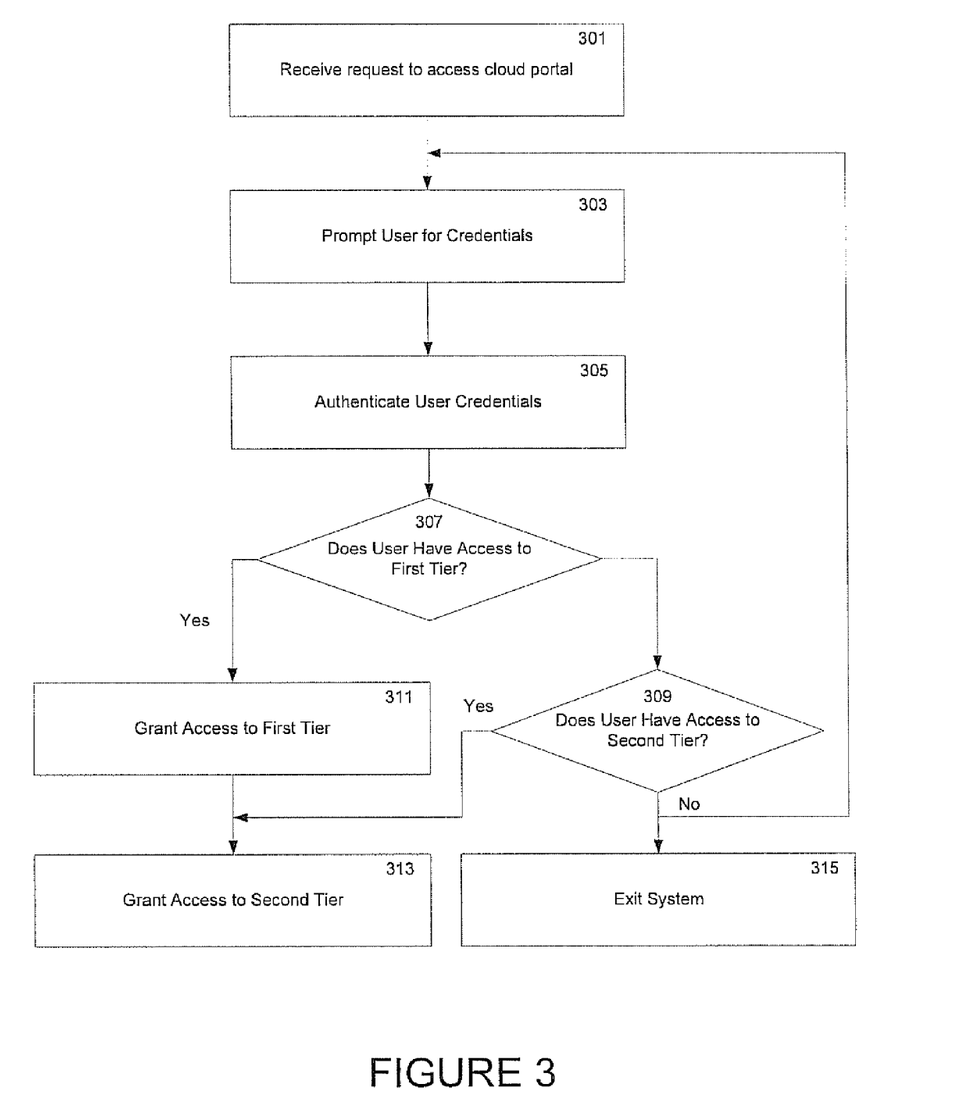
FIG. 3 is an illustration of a flowchart for managing a plurality of cloud user accounts in an integrated cloud portal, in accordance with various embodiments of the claimed subject matter.

FIG. 3 is an illustration of a flowchart for managing a plurality of cloud user accounts in an integrated cloud portal, in accordance with an embodiment. Specifically, the method enables granting access to an individual tier of services in an integrated cloud management system according to separate identification protocols. Steps 301-315 describe the steps comprising the process depicted in the flowchart of FIG. 3 in accordance with the various embodiments herein described. In one embodiment, the flowchart 300 is implemented as computer-executable instructions stored in a non-transitory computer-readable medium.

At step 301, a request from a user to access the cloud management system is received. The request from a user to access the cloud management system may be received as, for example, opening a connection (via a web browser) with the cloud management system or generating an instance of the graphical user interface of the cloud management system on a local computing system of the user. At step 303, the user is prompted to submit credentials corresponding to a user account in the cloud management system. In one embodiment, the credentials are provided to the user during or following registration within the system (or may be granted by an administrator such as an account with master credential access). In some embodiments, a single cloud account with a cloud vendor may correspond to a plurality of enterprise-side user accounts. That is, the enterprise may maintain a single cloud account with a cloud vendor, which integrates a plurality of employees or affiliated users of the enterprise. Once the user submits the requested credentials, the user-supplied credentials are authenticated in step 307. Authenticating the user-supplied credentials may be performed by, for example, referencing the user-supplied credentials with a database of stored credentials (credential repository) to verify the user's identity and/or level of authorization.

Based on the user's supplied credentials, the system determines the level of access the user is granted at step 307. If the user-supplied credentials are authorized according to a first identification protocol corresponding to a master account (e.g., by supplying master credentials) the user may be granted access to a first tier of functionality at step 311. In one embodiment, the first identification protocol consists of a username and password combination. Thus, a user supplying a paired username and password which matches master credential(s) stored in the credential repository may be granted access to the first tier of services.

According to some embodiments, the first tier of services comprises account management features, such as, for example, viewing billing information corresponding to one or more user account(s), enabling or enforcing policy application, auditing charges, and billing or profile information management. Billing information may be stored in the database and may be viewable by a user by referencing the pre-stored billing information. In one embodiment, billing information is periodically (e.g., once a month) acquired from the individual cloud providers by downloading the billing statement corresponding to the cloud account for each cloud vendor.

If, on the other hand, the user-supplied credentials are not authorized according to a first identification protocol, the credentials may be submitted for authorization according to a second identification protocol at step 309. The second identification protocol may consist of a paired set of a username or user id and an access key (e.g., a first string of letters and integers). In alternate embodiments, the second identification protocol may consist of a paired set of an access key and a secret key (e.g., a second string of letters and integers). In still further embodiments, the second identification protocol may consist of submitting an authorization token, which may be implemented as a file which may be uploaded to the cloud management system to verification, or according to a combination of two or more of the above specified protocol formats.

If the user-supplied credentials are authorized at step 311 according to the second identification protocol (e.g., the API or "cloud" credential), the user is granted access to a second tier of functionality at step 313. According to some embodiments, access to the second tier of services comprises access to cloud resource services, such as provisioning cloud resources, storing data in pre-provisioned cloud resources, executing applications in provisioned cloud resources and modifying data stored in pre-provisioned cloud resources. In further embodiments, a user granted access to the second tier of functionality may be directed to select from a plurality of cloud vendors or providers, after which a direct connection to the access point (e.g., web portal) of the selected cloud vendor or provider is facilitated through the graphical user interface of the cloud management system. According to some embodiments, users granted access to the first tier of functionality may also be granted access to the second tier of functionality automatically.

If the user-supplied credentials are not authorized according to either the first identification protocol or the second identification protocol, the process may return to step 303 and prompt the user to re-submit credentials or, according to some embodiments, exit the system entirely at step 315. In further embodiments, the process may maintain a counter of the number of user-credentials submitted (attempted accesses) for a single session. When the counter exceeds a pre-determined threshold, the user's connection to the system may be automatically closed, and subsequent attempts to connect to the system may be temporarily rejected.

Cloud Management System Architecture

Figure 4:
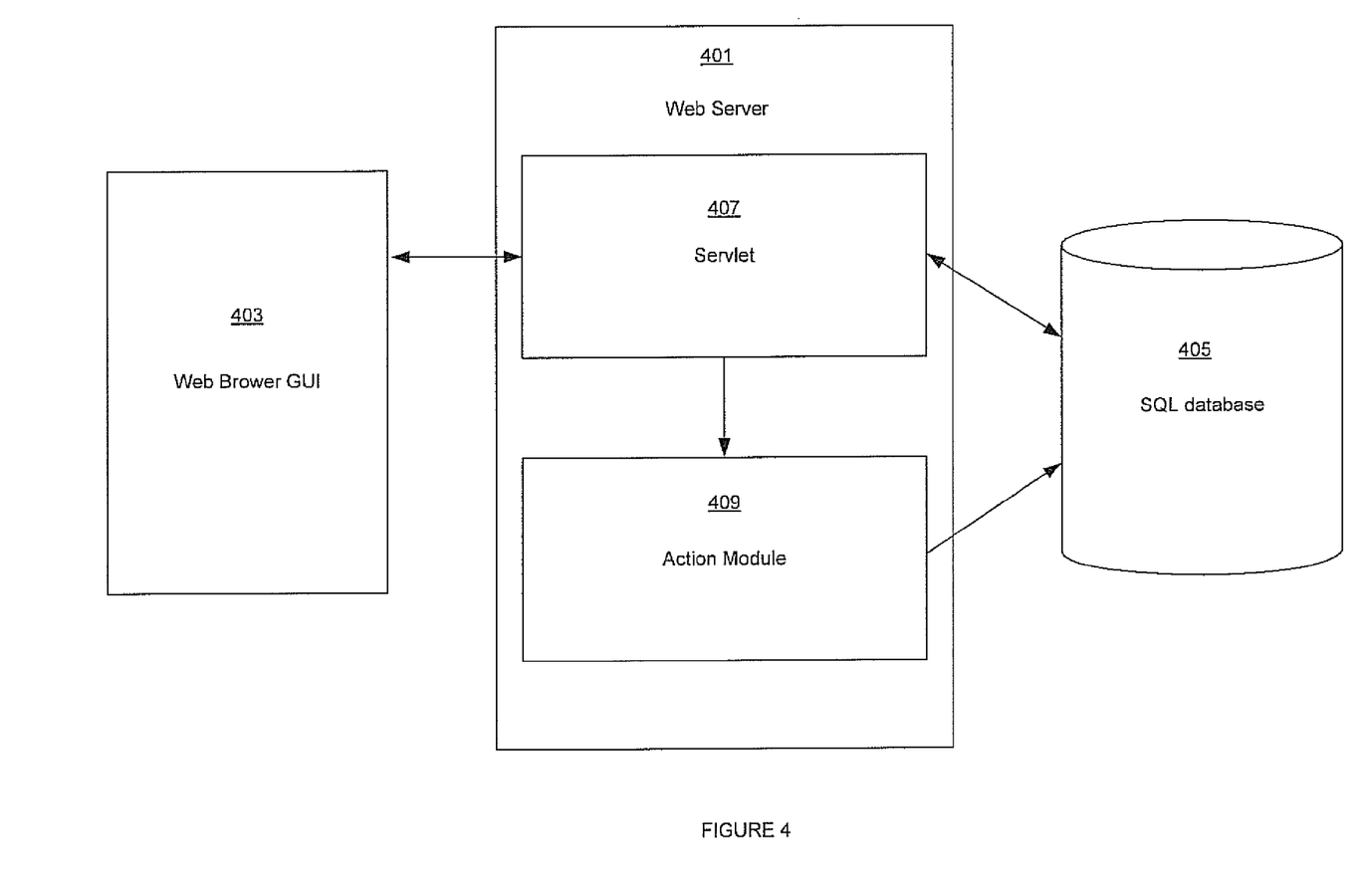
FIG. 4 is a block diagram of a credential repository, in accordance with various embodiments of the claimed subject matter.

FIG. 4 is a block diagram of a cloud management system, in accordance with various embodiments of the claimed subject matter. According to one embodiment, the cloud management system is implemented as a credential repository, and may include a web browser graphical user interface 403, a web server 401 which may comprise a plurality of servlets (407, 409) to process commands and/or perform actions. In one embodiment, a servlet (e.g., servlet 407) is responsible for communicating with the web browser graphical user interface 403 to retrieve information. For example, the servlet may be used to check (and authenticate if necessary) the user's identity, and then returns the appropriate information authorized for the user. In one embodiment, communication with the user interface 403 may be performed through a remote procedure call (RPC) mechanism.

In further embodiments, a separate servlet (e.g., action module 409) may be included in the credential repository that performs bulk actions that are not part of the web UI's request/response exchange. For example, periodically (e.g., once a month), the action module 409 may log into a cloud vendor portal, screen-scrap and download the billing statement for each account. Screen-scraping simulates a user accessing for information, and a program automatically parses the output for needed information. Screen scrapping may be performed, for example, by employing the accessibility layer of an operating system to access UI components. Thus, for instance, the action module 409 may access an individual cloud account with the individual's cloud credential, request (or view) billing information from the cloud vendor and parse the returned graphical output displayed on the user interface for the requested information. Alternatively, since cloud vendors typically provide a web portal, the web page of the cloud vendor itself may be parsed for relevant information.

Besides downloading billing statements, the action module 409 may also perform auditing and policy enforcement. For example, if a policy states that no cloud data should be unencrypted, the action module 409 may periodically take a sample, and check to see if any file conforms to the corporate policy. Since the cloud management system not only has the master credential, but also the API credential, it can easily invoke an API to perform the auditing. Information downloaded from the cloud portal, such as the billing statement and the credentials, may be stored in a database 405. In some embodiments, credentials may be encrypted before stored in the database 405 for security purposes. The servlet 407 itself does not keep any billing or credential data in memory. Credential verification and/or grants may be performed by querying the database for the latest information.

Cloud Access Model

Figure 5:
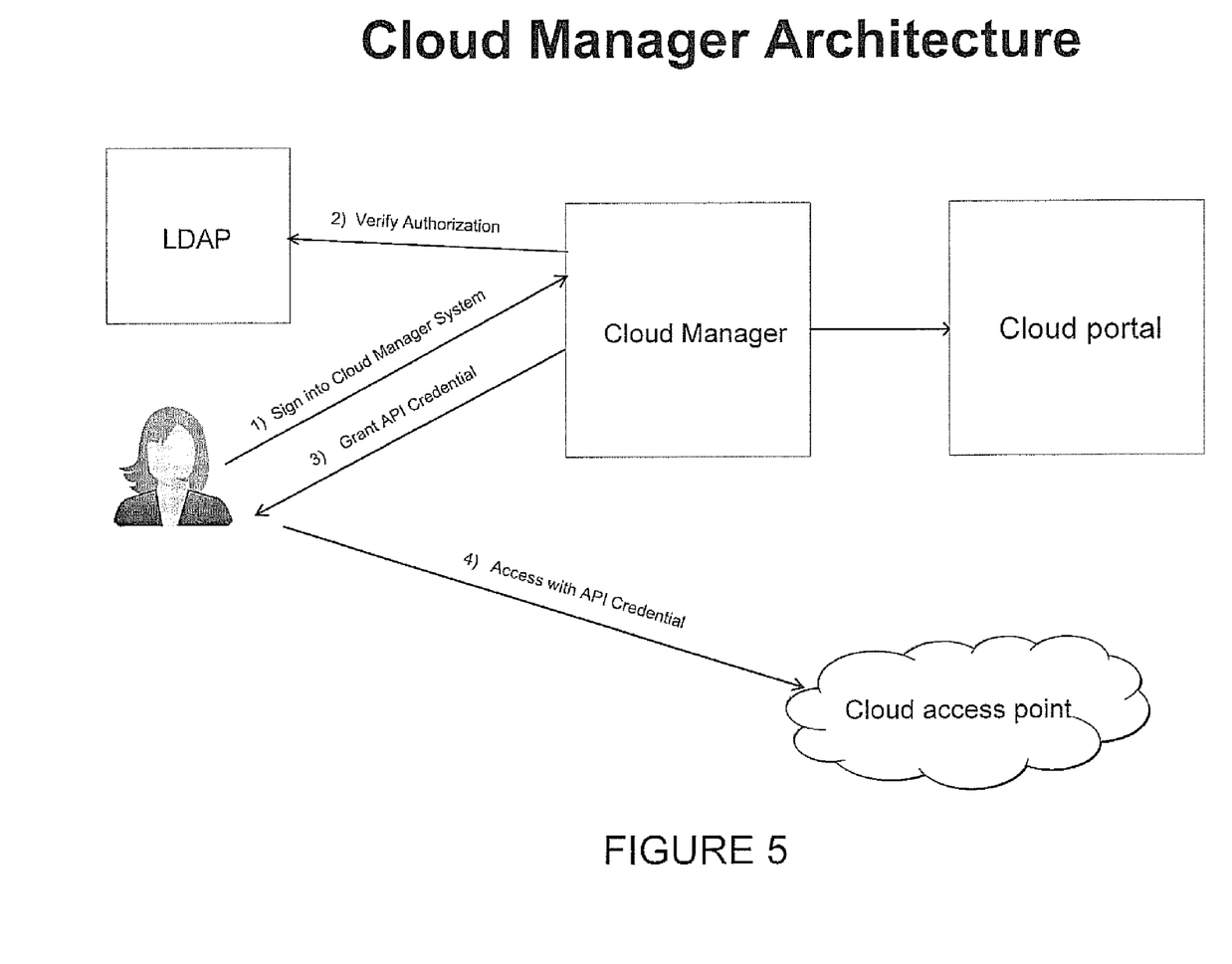
FIG. 5 is an illustration of a cloud access model in accordance with various embodiments of the claimed subject matter.

FIG. 5 is an illustration of a cloud access model in accordance with various embodiments of the claimed subject matter. In one embodiment, the cloud management system may be implemented as a web application, for which users can access directly from their web browser. The cloud management system may integrate with an enterprise's Lightweight Directory Access Protocol (LDAP) directory, to prevent multiple simultaneous usage of the same cloud account.

In one embodiment, the cloud management system interacts with the cloud portals of various cloud providers directly. Since the user no longer has access to the master credential of the cloud account, the user is no longer able to perform certain functions through the cloud account. For example, the user may not be able to obtain API credentials (e.g., API credentials must be granted by an account with master credentials). Other functionality which may be inaccessible to a user account may include downloading billing statements directly from the cloud service provider. According to some embodiments, the cloud management system may replicate those functions so that the user still has access to the same information, but may not have authorization to edit or modify certain fields. For example, to provide billing information to the user, the portal page may be screen-scrapped in order to download all billing statements.

The cloud management system is well suited to support multiple cloud providers. For example, the cloud management system may store the master credentials for multiple cloud providers, and may interact with each of the cloud portals. For users, the cloud management system can generate cloud accounts (and API credentials) from multiple cloud vendors, depending on user requests.

With the API credential, a user of the cloud management system can login to the system and perform all the customary cloud functions that the cloud portal is able to perform, such as requesting and downloading the API credential, viewing personal cloud usage, though account management features are still inaccessible to the user. Once the user has the API credential, the user can access cloud resources directly through the cloud access point.

According to a typical process according to FIG. 5, a user may log in to the cloud management system (step 1). The user's authorization may be verified (e.g., by comparing user-supplied credentials to the enterprise's LDAP) (step 2). A cloud access credential (API credential) may be automatically granted based on the verification of the user's authorization or, alternatively, may be manually granted by a user account with master credential access at step 3. Subsequently, the user may access cloud resources through the cloud's access point directly, with the granted API credential (step 4).

Billing Integration

Figure 6:
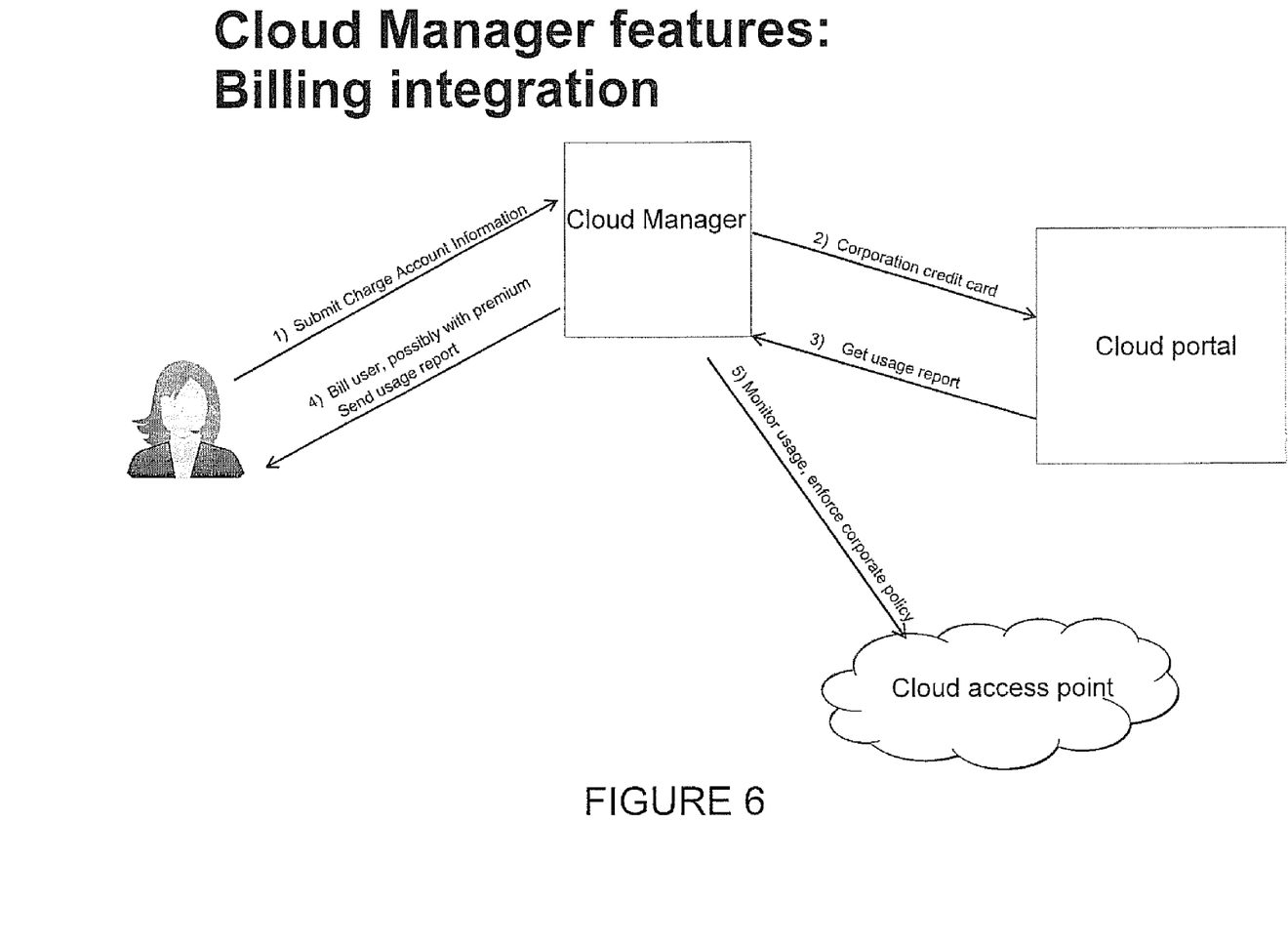
FIG. 6 is an illustration of a process for billing integration within a cloud access model in accordance with various embodiments of the claimed subject matter.

FIG. 6 is an illustration of a process for billing integration within a cloud access model in accordance with various embodiments of the claimed subject matter. According to one embodiment, the cloud management system may be integrated with an enterprise's internal billing process. The cloud management system accomplishes this by acting as a broker between the internal billing system and the cloud. Within the cloud portal, the cloud management system configures each cloud account to use a corporate credit card, which is charged each month by the cloud vendor and then paid directly by the IT department.

According to one aspect, billing may be consolidated for all cloud accounts under the cloud management system's management. This may allow an enterprise to benefit from volume discounts. According to a typical process as presented in FIG. 6, a user may submit corporate account information (step 1), which is relayed through the cloud management system to the portal of the cloud vendor (step 2). Periodically, the cloud vendor may submit usage reports to the cloud management system (step 3), whereupon the cloud management system may audit or parse the submitted usage reports to determine individual usage levels. At any subsequent time, the user may query the cloud management system for the individual's usage report (step 4). Meanwhile, usage may be monitored and corporate policy may be enforced within the cloud by the cloud management system (step 5).

In still further embodiments, the cloud management system may be configured to integrate with an internal charge back mechanism so that the system bills the individual department directly for any corresponding cloud resource usage. For example, since the cloud management system monitors the usage of each cloud account, the expenditure and the identity of the corresponding individual, billing can be performed efficiently at the enterprise level for all individuals and corresponding accounts.

Control and Policy Enforcement

Figure 7:
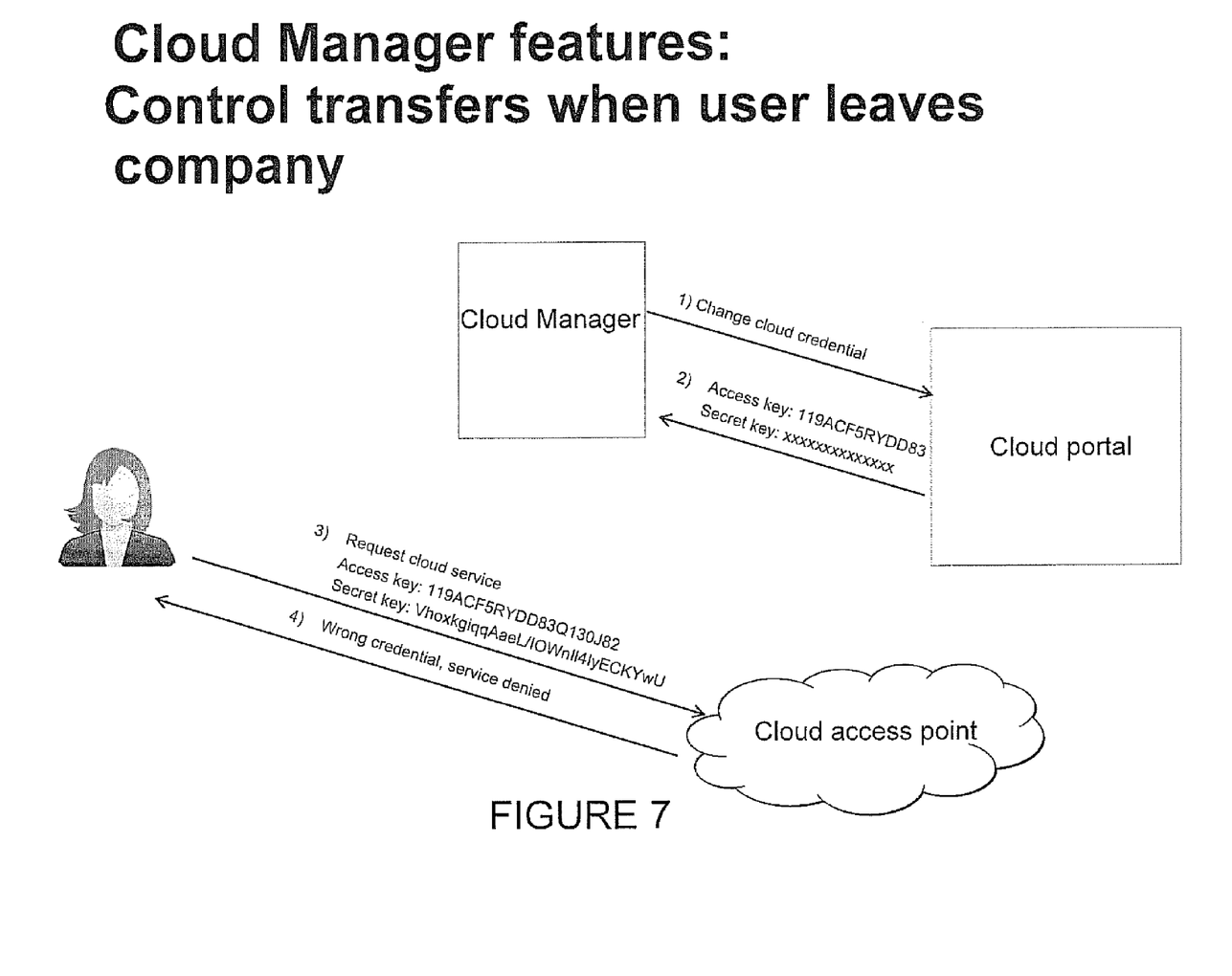
FIG. 7 is an illustration of a process for transfer of control of a cloud account in a cloud access model in accordance with various embodiments of the claimed subject matter.

FIG. 7 is an illustration of a process for transfer of control of a cloud account in a cloud access model in accordance with various embodiments of the claimed subject matter. According to a typical control transfer process as presented in FIG. 7, the security of proprietary data can be more effectively maintained through implementation of a credential vault or repository. For instance, when an individual with access to sensitive material leaves the company, the Cloud management system can simply reclaim the cloud account by changing the cloud credential corresponding to the individual's account (step 1 and 2). Since the individual was granted access to only the old cloud credential but not the master credential, once the cloud credential is changed, the individual would no longer have access to the cloud resources. Subsequent attempts by the employee to access data in the cloud will be summarily thwarted and service will be denied (steps 3 and 4). Instead, an executive or officer is able to reclaim any company sensitive data and reassign the cloud account to a new individual if needed.

Data Sharing

Figure 8:
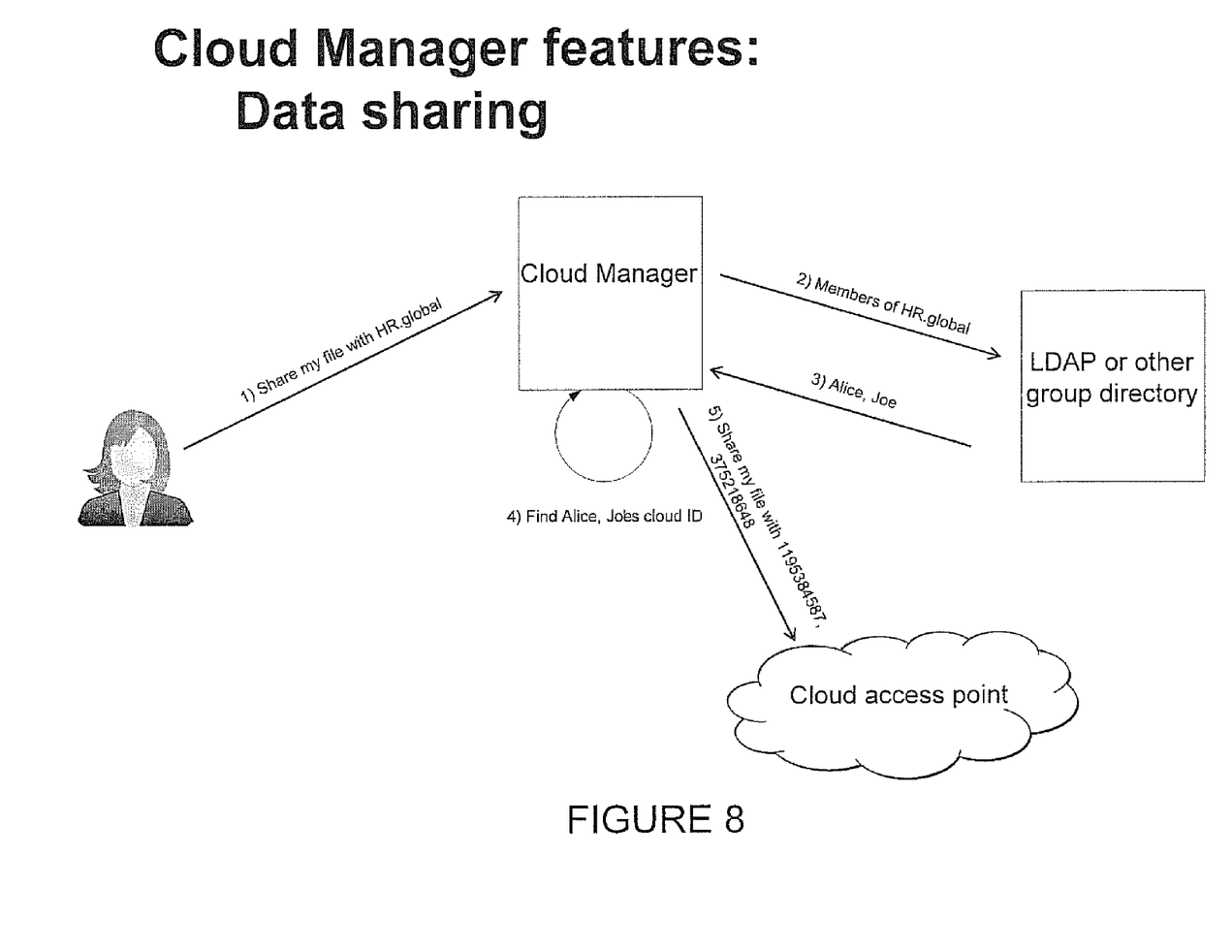
FIG. 8 is an illustration of a process for sharing data in a cloud access model in accordance with various embodiments of the claimed subject matter.

FIG. 8 is an illustration of a process for sharing data in a cloud access model in accordance with various embodiments of the claimed subject matter. Conventional data sharing across cloud accounts is cumbersome. A user may be required to specifically designate other users' cloud account ID (which may not be as simple as a user name) and manually enable sharing with the ID instead of a user name.

Data sharing among disparate cloud computing accounts may be facilitated with greater ease through a two tiered system, such as described in FIG. 8. In one embodiment, the cloud management system would integrate with a service directory (e.g., a lightweight directory access protocol directory) to add a group concept to data sharing. If a user wants to share a file with an entire group or department for example, the individual can specify within the cloud management system that the user wants to share the file with the identified group (step 1). The cloud management system automatically translates such a request into the individual's cloud account and performs the necessary actions in the cloud. This may comprise, for example, referencing the LDAP directory and expanding the group identity to include a list of user names (step 2, 3).

From the list of user names, the cloud management system then further expands the list to include a list of cloud account IDs by checking the cloud account IDs associated with each user (step 4). The data or image may be then shared with the list of account IDs (step 5). This can be done automatically since the cloud management system is aware of which cloud account corresponds to each user in the group or department and also maintains the cloud credential corresponding to the cloud accounts to carry out the task. When the group membership changes, the cloud management system can automatically adjust the permission level(s) of the applicable accounts to accurately and immediately reflect which accounts should and should not have access to the data.

Example Computing Device

Figure 9:
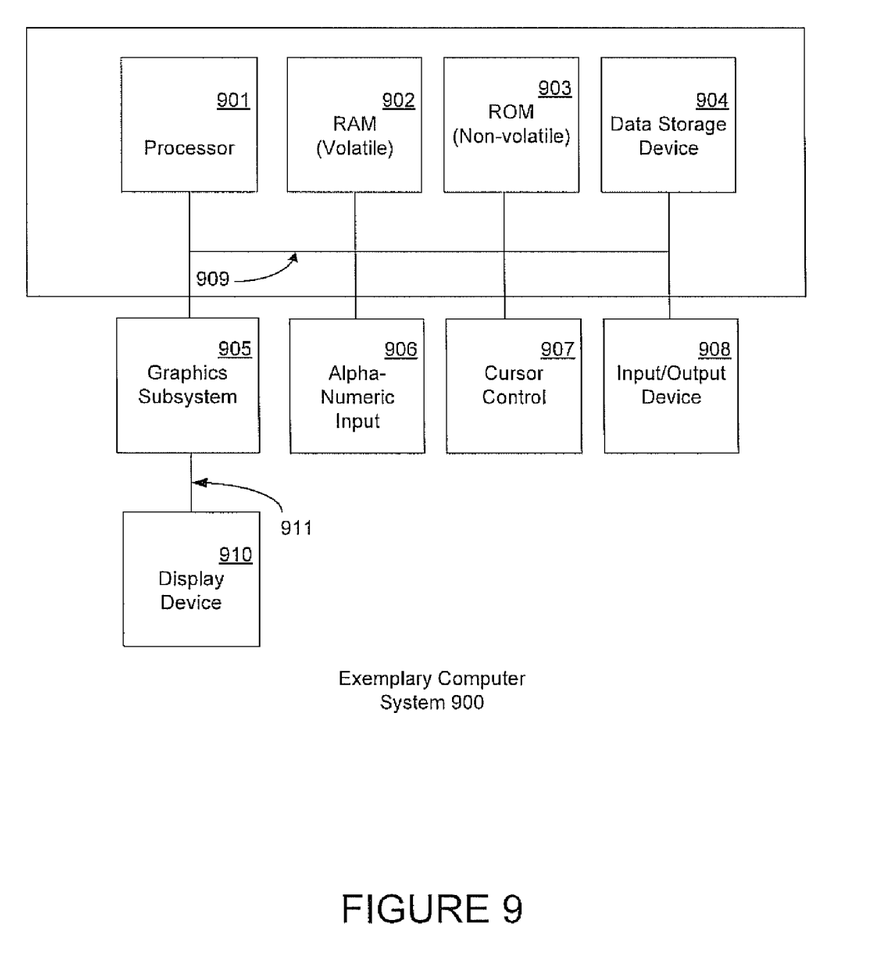
FIG. 9 is an illustration of a computing system in accordance with various embodiments of the claimed subject matter.

As presented in FIG. 9, a system upon which embodiments of the present invention may be implemented includes a general purpose computing system environment, such as computing system 900. In its most basic configuration, computing system 900 typically includes at least one processing unit 901 and memory, and an address/data bus 909 (or other interface) for communicating information. Depending on the exact configuration and type of computing system environment, memory may be volatile (such as RAM 902), non-volatile (such as ROM 903, flash memory, etc.) or some combination of the two.

Computer system 900 may also comprise an optional graphics subsystem 905 for presenting information to the computer user, e.g., by displaying information on an attached display device 910, connected by a video cable 911. According to embodiments of the present claimed invention, the graphics subsystem 905 may be coupled directly to the display device 910 through the video cable 911. A graphical user interface of instantiated by the cloud management system and executing in the remote computer system 900 of a user may be generated in the graphics subsystem 905, for example, and displayed to the user in the display device 910. In alternate embodiments, display device 910 may be integrated into the computing system (e.g., a laptop or netbook display panel) and will not require a video cable 911. In one embodiment, the process 400 may be performed, in whole or in part, by graphics subsystem 905 in conjunction with the processor 901 and memory 902, with any resulting output displayed in attached display device 910.

Additionally, computing system 900 may also have additional features/functionality. For example, computing system 900 may also include additional storage (removable and/or non-removable) including, but not limited to, magnetic or optical disks or tape. Such additional storage is illustrated in FIG. 9 by data storage device 907. Computer storage media includes volatile and nonvolatile, removable and non-removable media implemented in any method or technology for storage of information such as computer readable instructions, data structures, program modules or other data. RAM 902, ROM 903, and data storage device 907 are all examples of computer storage media.

Computer system 900 also comprises an optional alphanumeric input device 906, an optional cursor control or directing device 907, and one or more signal communication interfaces (input/output devices, e.g., a network interface card) 909. Optional alphanumeric input device 906 can communicate information and command selections to central processor 901. Optional cursor control or directing device 907 is coupled to bus 909 for communicating user input information and command selections to central processor 901. Signal communication interface (input/output device) 909, also coupled to bus 909, can be a serial port. Communication interface 909 may also include wireless communication mechanisms. Using communication interface 909, computer system 900 can be communicatively coupled to other computer systems over a communication network such as, for example, the Internet or an intranet (e.g., a local area network), or can receive data (e.g., a digital television signal).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for managing a plurality of cloud user accounts, the system comprising:
 a credential repository configured to manage access to a plurality of disparate tiers of cloud account services, the credential repository comprising:
  a graphical user interface, the graphical user interface configured to be instantiated in a web browser of a remote computing system;
  a web server configured to receive from, and transmit data to the graphical user interface; and
  a database communicatively coupled to the web server;
 wherein a first tier of the plurality of disparate tiers of cloud account services is accessible to authorized users according to a first identification protocol and comprises account administration services for a plurality of user accounts with a plurality of cloud providers, the account administrative services comprising functionality for tracking billing for the plurality of user accounts as a single account comprising a plurality of separate threads, each thread of the plurality of separate threads corresponding to a user account of the plurality of user accounts,
 further wherein a second tier of the plurality of disparate tiers of cloud account services is accessible to the plurality of user accounts according to a second identification protocol, the second tier of cloud account services comprising access to a plurality of cloud computing resources via a cloud portal shared among the plurality of user accounts, the second identification protocol not being equivalent to the first identification protocol.

2. The system according to claim 1, wherein the account administration services comprise functionality to automatically audit usage levels of a plurality of cloud computing resources provisioned through the second tier of authorized services.

3. The system according to claim 1, wherein the account administration services comprise functionality to automatically enforce enterprise policies for data stored in a plurality of cloud computing resources provisioned through the second tier of authorized services.

4. The system according to claim 1, wherein the database is configured to store a plurality of pre-generated credentials according to the second identification protocol.

5. The system according to claim 4, wherein the credential repository is configured to receive a set of user supplied credentials from a remote user through the graphical user interface and verify an identity of the user by comparing the user supplied credentials with the plurality of pre-generated credentials.

6. The system according to claim 5, wherein an authorization of the user to access the first or second tier of cloud account services corresponds to the identity of the user.

7. The system according to claim 5, wherein the plurality of cloud computing resources comprises at least one of either: a cloud-hosted storage service, a cloud-hosted database, or a cloud-hosted messaging service, or any combination thereof.

8. The system according to claim 1, wherein access to cloud computing resources comprises functionality to provision a plurality of cloud computing resources from a plurality of cloud vendors.

9. The system according to claim 8, wherein the plurality of cloud computing resources comprises a virtual machine.

10. A method for managing a plurality of user accounts in a cloud management system, the method comprising:
  receiving a request to access the cloud management system from a user of a computing device communicatively coupled to the cloud management system;
  prompting the user for credentials to access the cloud management system via a user interface instantiated by a processor comprised in the computing device;
  obtaining user credentials from the user;
  comparing the user credentials according to a first identification protocol and a second identification protocol;
  granting access to a first tier of functionality in the cloud management system in response to successfully comparing the user credentials according to the first identification protocol; and
  granting access to a second tier of functionality in the cloud management system in response to successfully comparing the user credentials according to the second identification protocol,
  wherein the first tier of functionality comprises account management functionality for a plurality of user accounts, the account management functionality comprising functionality for tracking billing for the plurality of user accounts as a single account comprising a plurality of separate threads, each thread of the plurality of separate threads corresponding to a user account of the plurality of user accounts,
  further wherein the second tier of functionality comprises functionality for accessing a plurality of cloud provider services through a cloud portal shared among the plurality of user accounts.

11. The method according to claim 10, wherein the receiving, the prompting and the obtaining are performed via a graphical user interface corresponding to the cloud management system.

12. The method according to claim 10, wherein the receiving, the prompting, and the obtaining are performed via a web application corresponding to the cloud management system.

13. The method according to claim 10, wherein the first identification protocol comprises verifying a user identity according to a username and password.

14. The method according to claim 10, wherein the second identification protocol comprises verifying a user identity according to a username and access key.

15. The method according to claim 14, wherein the second identification protocol further comprises verifying a user identity according to a secret key.

16. The method according to claim 14, wherein the second identification protocol further comprises verifying a user identity according to an authorization token.

17. The method according to claim 16, wherein access to the second tier of functionality is not granted to a user account unless authorized by a user through the first tier of functionality.

18. The method according to claim 10, wherein granting access to a first tier of functionality comprises granting access to integrated billing information for a plurality of user accounts created in the cloud management system.

19. The method according to claim 18, wherein granting access to the integrated billing information for a plurality of user accounts comprises displaying billing information corresponding to a usage level of services of a plurality of cloud providers by the plurality of user accounts.

20. The method according to claim 19, further comprising obtaining the billing information by downloading a plurality of billing statements corresponding to the user accounts corresponding to the plurality of cloud providers.

21. The method according to claim 20, wherein the obtaining the billing information further comprises parsing a generated output of usage details generated by the cloud provider for the corresponding user account.

22. The method according to claim 18, wherein granting access to a first tier of functionality comprises allowing auditing the integrated billing information.

23. The method according to claim 10, wherein granting access to a first tier of functionality comprises allowing automatic policy enforcement for data stored in provisioned cloud computing resources by the plurality of user accounts.

24. The method according to claim 23, wherein allowing automatic policy enforcement comprises allowing automatic encryption for data stored in provisioned cloud computing resources by the plurality of user accounts according to a pre-defined security configuration.

25. The method according to claim 10, wherein granting access to a second tier of functionality comprises granting access to services provided by a plurality of cloud providers.

26. The method according to claim 25, wherein the services provided by a plurality of cloud providers comprises provisioning cloud computing resources.

27. The method according to claim 25, wherein the services provided by a plurality of cloud providers comprises accessing provisioned cloud computing resources.

28. The method according to claim 25, wherein the services provided by a plurality of cloud providers comprises sharing data contributed by other users in affiliated user accounts within the cloud management system and stored in provisioned cloud computing resources corresponding to the affiliated user accounts.

29. The method according to claim 10, further comprising automatically creating a plurality of accounts with the plurality of cloud vendors corresponding to the plurality of user accounts via executing a program simulating user access.

30. The method according to claim 29, wherein the program simulating user access comprises a screen scraping application.

31. A non-transitory computer readable medium for executing a plurality of program instructions, which, when executed in a computing device, is operable to perform a method of managing a plurality of user accounts in an integrated cloud portal, the program instructions comprising:

instructions to receive, from a user, a request to access an integrated cloud portal, the integrated cloud portal being shared with a plurality of other users to access a plurality of cloud provider services;

instructions to solicit the user for credentials to access the integrated cloud portal;

instructions to obtain user credentials from the user;

instructions to compare the user credentials according to a first identification protocol and a second identification protocol;

instructions to grant access to a first tier of functionality in the integrated cloud portal in response to a successful comparison of the user credentials according to the first identification protocol; and instructions to grant access to a second tier of functionality in the integrated cloud portal in response to a successful comparison of the user credentials according to the second identification protocol, wherein the first tier of functionality comprises account management functionality for a plurality of user accounts, the account management functionality comprising functionality for tracking billing for the plurality of user accounts as a single account comprising a plurality of separate threads, each thread of the plurality of separate threads corresponding to a user account of the plurality of user accounts, further wherein the second tier of functionality comprises functionality for accessing the plurality of cloud provider services through a user account corresponding to the user.

32. The non-transitory computer readable medium according to claim 31, wherein the first identification protocol comprises verifying a user identity according to a username and password.

33. The non-transitory computer readable medium according to claim 31, wherein the second identification protocol comprises verifying a user identity according to a username and access key.

34. The non-transitory computer readable medium according to claim 33, wherein the second identification protocol further comprises verifying a user identity according to a secret key.

35. The non-transitory computer readable medium according to claim 33, wherein the second identification protocol further comprises verifying a user identity according to an authorization token.

36. The non-transitory computer readable medium according to claim 35, wherein access to the second tier of functionality is not granted to a user account unless authorized by a user through the first tier of functionality.

37. The non-transitory computer readable medium according to claim 31, wherein the instructions to grant access to a first tier of functionality comprises instructions to grant access to integrated billing information for a plurality of user accounts created in the integrated cloud portal.

38. The non-transitory computer readable medium according to claim 37, wherein the instructions to grant to the integrated billing information for a plurality of user accounts comprises instructions to display billing information in a graphical user interface, the billing information corresponding to a usage level of services of a plurality of cloud providers by the plurality of user accounts.

39. The non-transitory computer readable medium according to claim 38, wherein the program instructions further comprise instructions to obtain the billing information comprising instructions to download a billing statement corresponding to the plurality of user accounts corresponding to the plurality of cloud providers.

40. The non-transitory computer readable medium according to claim 39, wherein the instructions to obtain billing information is further obtained by parsing a generated output of usage details generated by the cloud provider for the corresponding user account.

41. The non-transitory computer readable medium according to claim 37, wherein the instructions to grant access to a first tier of functionality comprises instructions to allow auditing the integrated billing information.

42. The non-transitory computer readable medium according to claim 31, wherein the instructions to grant access to a first tier of functionality comprises instructions to allow automatic policy enforcement for data stored in provisioned cloud computing resources by the plurality of user accounts.

43. The non-transitory computer readable medium according to claim 42, wherein the instructions to allow automatic policy enforcement comprises instructions to allow automatic encryption for data stored in provisioned cloud computing resources by the plurality of user accounts according to a pre-defined security configuration.

44. The non-transitory computer readable medium according to claim 31, wherein the instructions to access to a second tier of functionality comprises instructions to grant access to services provided by a plurality of cloud providers.

45. The non-transitory computer readable medium according to claim 44, wherein the instructions to grant access to services provided by a plurality of cloud providers comprises instructions to provision cloud computing resources from the plurality of cloud providers.

46. The non-transitory computer readable medium according to claim 44, wherein the instructions to grant access to services provided by a plurality of cloud providers comprises instructions to allow access provisioned cloud computing resources.

47. The non-transitory computer readable medium according to claim 44, wherein the instructions to grant access to services provided by a plurality of cloud providers comprises instructions to share data contributed by other users in affiliated user accounts within the integrated cloud portal and stored in provisioned cloud computing resources corresponding to the affiliated user accounts.

* * * * *